SEQUENTIAL DOT INTERLACE SYSTEM AND METHOD FOR TELEVISION

Filed May 4, 1967 10 Sheets-Sheet 1

INVENTOR
EDWARD S. SMIERCIAK
BY Hood, Gust + Irish
ATTORNEYS

SEQUENTIAL DOT INTERLACE SYSTEM AND METHOD FOR TELEVISION

Filed May 4, 1967 10 Sheets-Sheet 2

INVENTOR
EDWARD S. SMIERCIAK
BY Hood, Gust & Irish
ATTORNEYS

INVENTOR
EDWARD S. SMIERCIAK
BY [signature]
ATTORNEYS

INVENTOR
EDWARD S. SMIERCIAK
BY Hood, Gust + Irish
ATTORNEYS

INVENTOR
EDWARD S. SMIERCIAK
BY Wood, Isub & Aish
ATTORNEYS

INVENTOR
EDWARD S. SMIERCIAK
BY Hood, Gust & Irish
ATTORNEYS

INVENTOR
EDWARD S. SMIERCIAK
BY Hood, Gust + Irish
ATTORNEYS

March 10, 1970 E. S. SMIERCIAK 3,499,980

SEQUENTIAL DOT INTERLACE SYSTEM AND METHOD FOR TELEVISION

Filed May 4, 1967 10 Sheets-Sheet 8

INVENTOR
EDWARD S. SMIERCIAK

BY Hood, Gust + Irish

ATTORNEYS

INVENTOR
EDWARD S. SMIERCIAK
BY Hood, Gust & Irish
ATTORNEYS

March 10, 1970 E. S. SMIERCIAK 3,499,980

SEQUENTIAL DOT INTERLACE SYSTEM AND METHOD FOR TELEVISION

Filed May 4, 1967 10 Sheets-Sheet 10

INVENTOR
EDWARD S. SMIERCIAK
BY Wood, Gust & Irish
ATTORNEYS

United States Patent Office 3,499,980
Patented Mar. 10, 1970

3,499,980
SEQUENTIAL DOT INTERLACE SYSTEM AND METHOD FOR TELEVISION

Edward S. Smierciak, Fort Wayne, Ind., assignor to International Telephone and Telegraph Corporation, a corporation of Delaware Filed May 4, 1967, Ser. No. 636,060
Int. Cl. H04n *3/00, 3/16;* H04l *7/00*
U.S. Cl. 178—6.8 30 Claims

ABSTRACT OF THE DISCLOSURE

A sequential dot interlace system for raster-type television apparatus which employs a time-based video signal having recurrent line and frame synchronizing pulses, there being a predetermined number of lines in each frame and the video signal including an information-conveying portion which has a predetermined minimum duration interval between line synchronizing pulses, i.e., a predetermined tolerance in the line frequency. The incoming line and frame synchronizing pulses are detected, each detected line synchronizing pulse triggering a delay multivibrator. The multivibrator generates a delayed pulse which terminates shortly after termination of the line synchronizing pulse, the trailing edge of the delayed pulse sets an enable flip-flop to provide an enabling signal. The enabling signal actuates a clock pulse generator which generates a train of clock pulses. The clock pulses are counted by an element counter and when a predetermined number has been reached during the information-conveying interval of the video signal, i.e., within the predetermined tolerance limit before the next line synchronizing pulse, the enable flip-flop is reset thus terminating the enabling signal and deactuating the clock pulse generator thereby establishing a "quasi line" having D elements. An interlace counter also counts the clock pulses cumulatively from line to line and generates a sampling pulse in response to each successive group of a predetermined number of clock pulses. The line and frame synchronizing pulses and the sampling pulses actuate a sampling gate so as to provide a train of sampled video signal pulses. In order to provide interlacing, the number of clock pulses in each group is divisible into the number of clock pulses in each line by a first integer which is greater than one with a second integer remainder, the number of lines in a frame, the number of clock pulses in a line and the integer being of one numerical quantity, i.e., odd or even, and the number of clock pulses in each group being of the other numerical quantity, and the quotient $LD/n_1n_2$, where L is the number of lines in a complete picture (frame), D is the number of elements or dots in the quasi line, $n_1$ is the vertical interlace ratio (if any), and $n_2$ is the dot interlace ratio, must be irreducible, i.e., there are no common factors of the products LD and $n_1n_2$. Thus, in a television system having 525 lines per frame, there may be 381 clock pulses per line and 4 clock pulses in each group, the number of pulses in each group (4) thus being divisible into the number of pulses in each line (381) by the integer 95 with a remainder of one. The ratio of the number of clock pulses in a group to the respective sampling pulse, which may be for example 4 to 1, 8 to 1, 16 to 1, or 32 to 1, is the dot interlace ratio, and indicates that all of the information normally transmitted in a single frame is transmitted in four, eight, sixteen or thirty-two frames.

BACKGROUND OF THE INVENTION

Field of the invention

This invention relates generally to raster-type television systems, and more particularly to a sequential dot interlace system and method for raster-type television systems.

Description of the prior art

In conventional broadcast television, 30 complete frames are transmitted each second, each frame comprising 525 lines. With each line containing on the order of 400 picture elements, each of which can have many levels of brightness, i.e., black, greys, and white, the transmission of conventional broadcast television picture signals requires a transmission facility having a band width of approximately 4 megacycles. However, from an information standpoint, this television picture contains much more information than the human eye can possibly assimilate. Thus, due to the limitations of the human eye, television pictures can be presented containing less information without severe picture quality degradation.

It has been proposed to reduce the bandwidth required for television signal transmission by taking advantage of the psycho-physical characteristics of the human eye. In accordance with such proposals, a normal line-type television presentation is divided into a series of dots or elements, a first fractional part of all the dots in a frame being transmitted in a first frame, another fractional part in the second frame, and so forth, the number of such fractions depending upon the amount of bandwidth reduction desired. By thus transmitting these dots or elements in a sequential manner, a resulting image is generated containing sufficient information for the eye, by reason of its psycho-physical characteristics, to perceive the entire picture.

Certain of the prior dot interlace systems have transmitted the dots in a predetermined sequence, such as every second, fourth, eighth, sixteenth, etc., dot, while others have utilized a random selection of dots for transmission in each frame. Such prior systems are described and illustrated in Patents Nos. 2,479,800, 2,939,909 and 3,136,847 and in an article by Sid Deutsch appearing in the I.E.E.E. Transactions on Broadcasting for July 1965, pages 11 through 21.

The present invention is concerned with sequential dot interlacing of the type in which dots in a predetermined sequence from each line are transmitted, rather than the random-type of interlacing. The principal of operation of this interlacing concept is essentially the same as that employed in normal television for vertical interlacing of the horizontal scanning lines, the only difference being that the interlacing now takes place in the horizontal axis rather than the vertical axis. Thus, in a television system employing an odd number of lines in each frame, i.e., 525 in conventional broadcast television, in order to have an even interlacing relationship, the number of elements which are going to be interlacing, i.e., the number of elements or dots in each line, must be an odd number. Therefore, if the number of elements or dots in each line is odd and predetermined even elements are sampled, i.e., every second, fourth, eighth, sixteenth, etc., element, and subject to the above-stated limitation as to the quotient $LD/n_1n_2$, the display will automatically interlace and after the corresponding number of frames, all of the information contained in field of view of the camera will be displayed at the receiver.

Prior dot interlace systems known to the present applicant, including those described in the above-referred to patents and publication, require the interlace frequency, i.e., the frequency of the elements or dots in each line be some odd multiple of the frequency which is being interlaced, i.e., the line frequency. It is essential that the odd number of elements or dots be held constant over the total interval from one line synchronizing pulse to the next since an error of only a single pulse in a line will destroy the interlace. The prior systems as known to the present applicant have attempted to hold the odd number of elements or dots constant by multiplying the line frequency, deriving the line frequency by dividing the element frequency, or by the use of an A.F.C.-controlled oscillator gated by the line synchronizing pulses. Such control is, however, inherently a most difficult problem because of the frequency tolerance involved in a standard television signal, and thus, prior interlace systems have exhibited instability because of the attempt to maintain this critical frequency relationship. For example, the R.E.T.M.A. specifications on line synchronizing pulse frequency permit a change in frequency up to 0.15 percent per second and up to $\pm 1$ percent for long term. This means that the interlace oscillator frequency must be able exactly to change with the line frequency over a range of .60 percent per second or four percent long term where the interlace ratio is 4:1, and correspondingly higher percentages for higher interlace ratios, which is a virtually unobtainable objective with conventional automatic frequency control.

In addition, the display provided by prior dot interlace systems where the interlace ratio is higher than 2:1 appears to creep or crawl across the tube, such creeping effect being highly objectionable from the viewer's standpoint. Finally, the prior dot interlace systems known to the present applicant have been characterized by their complexity and have not been suitable for mere addition to conventional broadcast television transmission and receiver apparatus.

SUMMARY OF THE INVENTION

The system and method of the present invention recognizes the fact that the only real requirement for dot interlacing is that the number of elements or dots in each line be the same, subject to the above-stated limitation as to the quotient $LD/n_1,n_2$; it is not a requirement that the interlace frequency, i.e., the frequency of the elements or dots be an odd multiple of the line frequency. Each line has a usable or information-conveying signal portion which occurs between successive line synchronizing pulses. Bearing in mind the tolerance in line frequency above-referred to, the usable portion of each line thus has a minimum duration interval between successive line synchronizing pulses, i.e., the duration of the usable portion may be longer than the minimum interval up to the maximum tolerance limit, but will not be less than the minimum interval, provided, of course, that the line frequency is within the prescribed tolerance limits. Thus, in accordance with the system and method of the invention, rather than trying to vary the interlace frequency so that the prescribed odd number of elements or dots occurs during exactly the time of a line, the interlace frequency is selected and controlled independently of the line frequency so that the requisite odd number of elements are always generated during the minimum usable interval of each line. Thus, if the line frequency is lower than the minimum tolerance so that the usable portion or interval is longer than the minimum and/or the interlace frequency is higher than the minimum tolerance, more than the requisite odd number of elements may be generated during the usable portion of the line, however, only the prescribed odd number of elements are utilized. Thus, in accordance with the invention, what may be referred to as a "quasi" line is established which contains the exact predetermined number of interlace elements, this "quasi" line in all cases having a duration no longer than the minimum duration or interval of the usable portion of each line, maintenance of this exact predetermined number of interlace elements during some increment of time during each line, within the tolerance of the interlace frequency generated, resulting in a stable interlaced display.

It should be pointed out that where the number of lines in a frame is an odd number, as in conventional broadcast television, the number of interlace elements in a line will likewise be odd and the interlace ratio will be even, whereas if the number of lines in a frame is an even number, the number of interlace elements in a line will also be even while the interlace ratio will be odd.

In accordance with the broader aspects of the invention, selectively actuable means is provided for generating a train of clock pulses and means is provided responsive to a respective line synchronizing pulse for actuating the clock pulse generating means adjacent the start of the respective usable signal portion. First means is provided for counting the clock pulses and for deactuating the clock pulse generating means in response to a first predetermined integral number of clock pulses generated during the minimum duration interval between line synchronizing pulses. Second means is provided for cumulatively counting the clock pulses from line to line and for providing a train of sampling pulses respectively responsive to each successive group of a second predetermined number of the clock pulses, the second predetermined number being divisible into the first number of clock pulses in a line by a first integer greater than one with a second integer remainder, the number of lines in a frame, the first predetermined number of clock pulses, and the remainder integer being of one numerical quality, i.e., odd or even, and the second predetermined number of clock pulses being of the other numerical quality. Means is provided for coupling the input video signal to output circuit means in response to the sampling pulses thereby to provide a train of sampled video signal pulses.

In one embodiment of the invention, the first clock pulse counting means include selectively actuable means for alternatively deactuating the clock pulse generating means in response to the first predetermined number of clock pulses and to a third predetermined number of clock pulses generated during the minimum duration interval, the second predetermined number of clock pulses being likewise divisible into the third number of clock pulses in a line by the first integer but with a third integer remainder which is higher than the second integer remainder, the third predetermined number of clock pulses and the third integer remainder likewise being of the one numerical quality, and means is provided for actuating the second selectively actuable means in response to each frame of the video signal in order to provide the first and third predetermined number of clock pulses, i.e., elements or dots, in alternate frames, respectively. The remainder integer determines the direction and nature of the dot creeping in the display and alternating the remainder thus eliminates this objectionable feature.

With only the sampled video signal pulses being transmitted, i.e., a pulse for every four elements in the case of a 4:1 interlace ratio, one pulse for every eight elements in the case of an 8:1 interlace ratio, etc., the bandwidth requirement of the transmission facility is reduced by the amount of the interlace ratio. Thus, in the case of 525 line broadcast television, with a 4:1 interlace ratio, the bandwidth requirement is reduced from four megacycles to one megacycle.

The line-type display at the receiving station, to which the ordinary viewer is accustomed can be substantially restored by the use of longer persistence phosphors or by the insertion at the receiver of video signal pulses between the received sampled pulses. Such inserted pulses may either have an arbitrary grey level, or bear an amplitude relationship to either the immediately preceding pulse or to preceding and succeeding pulses. Furthermore, the interlacing signals transmitted during each frame may be sequentially stored in separate channels of storage means, such as a multi-track video disc or tape, and simultaneously read-out in order to provide an essentially reconstructed line-display.

It is accordingly an object of the invention to provide an improved sequential dot interlace system for raster-type television.

Another object of the invention is to provide an improved sequential dot interlace method for raster-type television.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 16 is a fragmentary schematic block diagram showing the system for use with the video disc of FIG. 15;

FIGS. 17A–E are diagrams useful in explaining the mode of operation of the video disc recording system in FIGS. 15 and 16;

DESCRIPTION OF THE PREFERRED EMBODIMENTS

Figure 1:
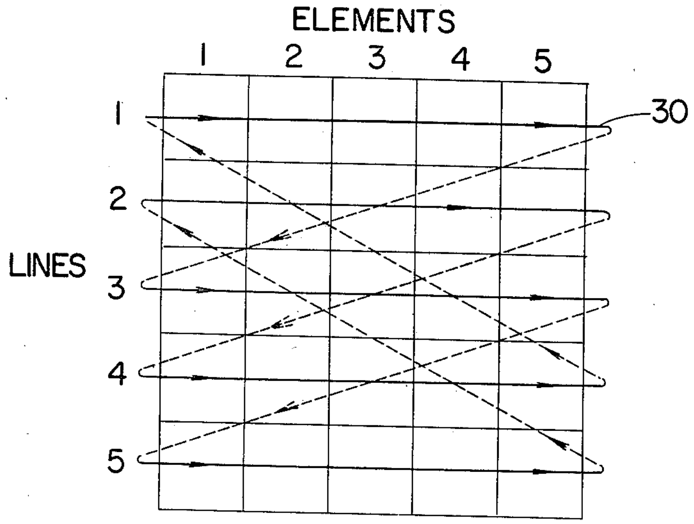
FIG. 1 is a diagram showing a simplified five-line by five element television image with 2:1 vertical interlace as used in standard broadcast television useful in explaining the method of the invention.

Referring now briefly to FIG. 1, in order to understand the manner in which video elements are extracted from a line-type television signal and displayed in the sequential dot interlace system of the invention, an arbitrary five-line television picture is shown with each line arbitrarily divided into five elements, this simplified five line by five element diagram being equivalent to an incremental portion of the complete 525 line television image having a vertical interlace ratio of 2:1 and a sequential dot interlace ratio of 4:1. It will be observed that the number of lines is odd, i.e., five, and that the number of elements in each line, i.e., five, is also odd, thus satisfying the requirement for even sequential dot interlace.

Figure 2:
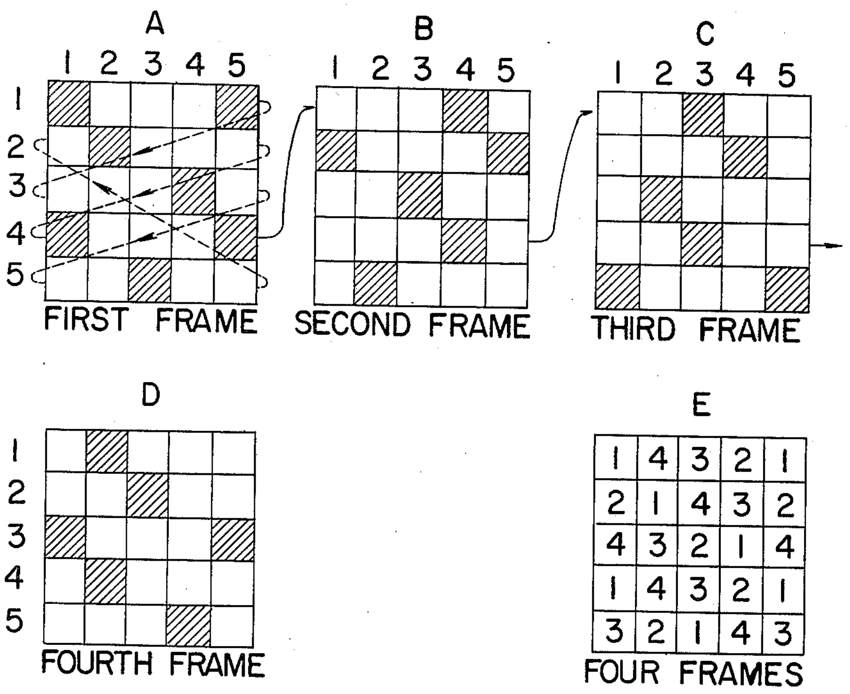
FIGS. 2A–E are further diagrams similar to FIG. 1 showing a 4:1 sequential dot interlace method, also useful in explaining the invention.

FIG. 1 shows the scanning path followed by the beam of the camera tube (and also by the beam of the display tube) during each frame, in order to better understand the diagram shown in FIG. 2, shortly to be described. It will be observed that the scanning beam, as shown by the line 30, starts its scan on the first element of the first line, scanning horizontally to the fifth element, the beam then scanning horizontally across lines 3 and 5 and then returning to scan lines 2 and 4 in accordince with the coventional vertical interlace system employed in broadcast television.

Referring now to FIGS. 2A–D, the same simplified five line by five element diagram of FIG. 1 is shown with the particular elements in each frame which are displayed in a 4:1 sequential dot interlace system (in which every fourth element is transmitted and displayed) being shaded. Thus considering first FIG. 2A, starting with the first element of the first line, first frame, and taking every fourth element along the scanning path shown in FIG. 1, which utilizes the conventional vertical interlace, it will be observed that the first and fifth elements of the first line are transmitted and received followed by the fourth element of the third line, the third element of the fifth line, the second element of the second line, and the first and fifth elements of the fourth line. When the fourth line has been scanned, the first frame has been completely scanned and scanning the second frame commences with every fourth element selected as shown. The third and fourth frames are then scanned with every fourth element being transmitted and received, as indicated by the shaded elements.

Referring now to FIG. 2E, the numbers in the video element spaces refer to the frame during which the corresponding element was transmitted and displayed, and it will be seen that after four complete frames, all of the video elements have been displayed. Thus considering the first line of the displayed image, the first and fifth elements were transmitted in the first frame, the second element in the fourth frame, the third element in the third frame and the fourth element in the second frame.

Figure 3:
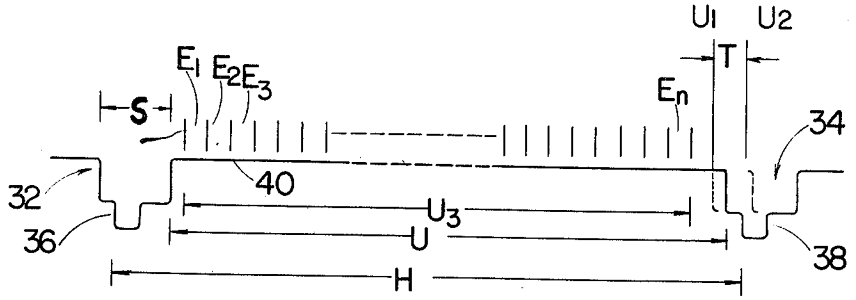
FIG. 3 is a diagram showing one line between synchronizing pulses also useful in explaining the invention.

Referring now to FIG. 3, a portion of a conventional broadcast television video signal is shown consisting of two successive line synchronizing pulses 32, 34, respectively, having conventional pedestals 36, 38, and with the information-conveying signal portion 40 therebetween. Under the RETMA standards for horizontal television sync., the width or duration S of the horizontal sync. pulses must be no more than .18H, H being the total duration of the line from one line synchronizing pulse to the next, which means that the duration U of the usable signal portion 40 will have a minimum duration of .82H. However, as indicated above, the line frequency, i.e., the frequency of the line synchronizing pulses and thus the duration H is subject to a tolerance of $\pm .15$ percent per second and $\pm 1$ percent long term with the result that the duration U of the usable signal portion 40 is subject to a tolerance T, i.e., the usable signal portion 40 may terminate anywhere between $U_1$ and $U_2$ and still be within tolerance. In view of this tolerance T in the duration U of the usable signal portion 40, clearly an attempt to divide the duration H of one line exactly into an odd number of elements by the generation of a signal having a frequency which is an odd multiple of the line frequency is extremely difficult.

Examination of FIG. 3 will indicate, however, that only the usable elements contained in the scan line are of significance, i.e., those elements occurring during the duration U of the usable signal portion 40, and therefore that it is not necessary to break up the entire line from one synchronizing pulse to the next into the proper number of elements, but on the contrary, only necessary to break up the usable portion 40 into the proper number of elements. It has further been determined that it is not necessary to divide the duration U of the usable signal portion 40 exactly into the requisite number of elements (odd when the number of lines per frame is odd), but that all that is required to maintain interlace is that the proper number of elements E per line be generated sometime during the duration U of the usable signal portion 40, there being no requirement that the frequency of the elements E bear any particular relationship to the line frequency, This fact in turn indicates that the requisite number of interlace elements E can be generated during an interval less than the duration U, which permits generation of the interlace elements E to be initiated after termination of the respective line synchronizing pulse in order to accommodate the tolerance in the duration S, and terminated prior to the minimum duration $U_1$ in order to accommodate the tolerance T. Thus, it is only necessary to generate the requisite number of interlace elements E during an interval $U_3$ which is shorter than a normal minimum duration $U_1$ in order to accommodate the tolerance T. In fact, it is desirable that the requisite number of interlace elements E be generated so that the last element $E_n$ terminates prior to termination of the duration $U_1$ in order to provide some additional margin for error so that the worse variation of line frequency will not interfere with the proper number of elements and thus the interlace.

Figure 4:
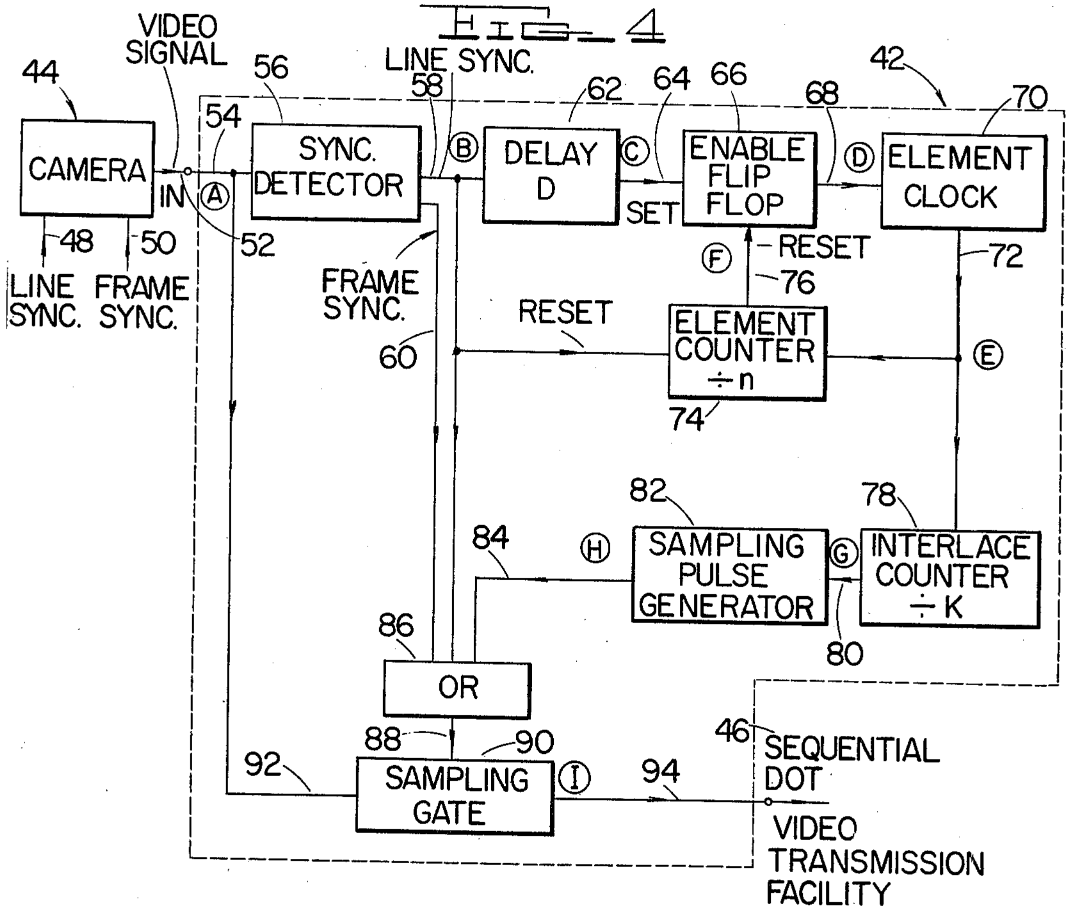
FIG. 4 is a schematic block diagram showing the basic sequential dot interlace system of the invention as employed at the transmitting station.

Referring now to FIG. 4, the basic sequential dot interlace system of the invention, shown within the dashed line box 42, may be connected between conventional camera apparatus 44 and a conventional transmission facility 46 which, however, may have a narrower bandwidth capability than would otherwise be required, no modification in either the camera apparatus or the transmission facility being required. The camera apparatus 44 includes conventional line and frame synchronizing signal sources 48, 50 and a video signal output circuit 52.

The sequential dot interlace system 42 of the invention includes an input circuit 54 coupled to the video signal output circuit 52 of the camera apparatus 44. A conventional sync. detector and separator circuit 56 is provided having an output circuit 58 for the separated line synchronizing pulses and an output circuit 60 for the separated frame synchronizing pulses. It will be readily understood that if the sequential dot interlace system 42 is located on or immediately adjacent to camera apparatus 44, the sync. detector and separator circuit 56 may be eliminated and lines 58, 60 directly coupled to the line and frame synchronizing pulse sources 48, 50. The line sync. pulse output circuit 58 is coupled to a conventional delay circuit 62, which may be a conventional monostable multivibrator, which generates a time delay pulse in response to the detected line sync. pulse, the delay pulse terminating after termination of the respective line sync. pulse. Output circuit 64 of the delay circuit 62 is coupled to the "set" circuit of a conventional enable flip-flop circuit 66 which generates an enabling signal in its output circuit 68. The enabling signal in output circuit 68 actuates a conventional clock pulse generator 70 which generates a train of clock pulses, the period of which corresponds to the interlace elements E. The frequency of the clock pulse generator or element clock 70 is set so that the requisite number of interlace pulses are generated during the interval $U_3$, the number of elements E being determined by the resolution required.

The clock pulses generated by the clock pulse generator 70 appear in its output circuit 72, which is coupled to a conventional pulse counting circuit 74, which counts-down the clock pulses and provides a signal in its output circuit 76 when the desired number *n* of clock pulses have been generated. Output circuit 76 of the element counter 74 is coupled to the "reset" circuit of the enable flip-flop 66 thereby terminating the enabling signal and stopping the clock pulse generator 70.

It will thus be seen that the delay circuit 62 and the enable flip-flop circuit 66 insure that the clock pulse generator 70 is started at the same time on each line, i.e., after termination of the respective line synchronizing pulse, the element counter 74 and enable flip-flop circuit 66 further insuring that the clock pulse generator 70 is stopped when exactly the prescribed number of pulses have been generated. The element counter 74 is reset by the respective line synchronizing pulse at the beginning of each line, line sync. output circuit 58 of the sync. detector 56 being coupled to the "reset" circuit of the element counter.

Output circuit 72 of the clock pulse generator 70 is also coupled to the interlace counter 78, which is a conventional non-resetting pulse counter which counts-down the clock pulses, cumulatively from line to line and provides an output pulse in its output circuit 80 in response to each predetermined number of clock pulses in accordance with the interlace ratio desired, i.e., four, eight, sixteen, etc. (where there are an odd number of lines per frame). Thus, the interlace counter 78 provides an output pulse for every fourth, eighth, sixteenth, etc., clock pulse. The output circuit 80 of the interlace counter 78 is coupled to a conventional sampling pulse generator 82 which provides in its output circuit 84 a narrow sampling pulse in response to each output pulse provided by the interlace counter 78.

The line sync. output circuit 58, frame sync. output circuit 60 and output circuit 84 of the sampling pulse generator 82 are coupled to a conventional "OR" circuit 86 which has its output circuit 88 coupled to the triggering circuit of a conventional sampling gate 90. The video signal input circuit 54 is coupled to the input circuit 92 of the sampling gate 90 which has its output circuit 94 coupled to the transmission facility 46. Sampling gate 90 is normally gated "OFF" being gated "ON" to pass the video signal from the camera apparatus 44 in response to the line and frame synchronizing pulses and to the sampling pulses provided by the sampling pulse generator 82, in turn in response to the interlace pulses provided by the interlace counter 78. Thus, the video signal passed to the transmission facility 46 by the sampling gate 90 between the line synchronizing pulses consists of a train of sampled video signal pulses, there being only one such video signal pulse for each four, eight, sixteen, etc., clock pulses or elements E.

Figure 5:
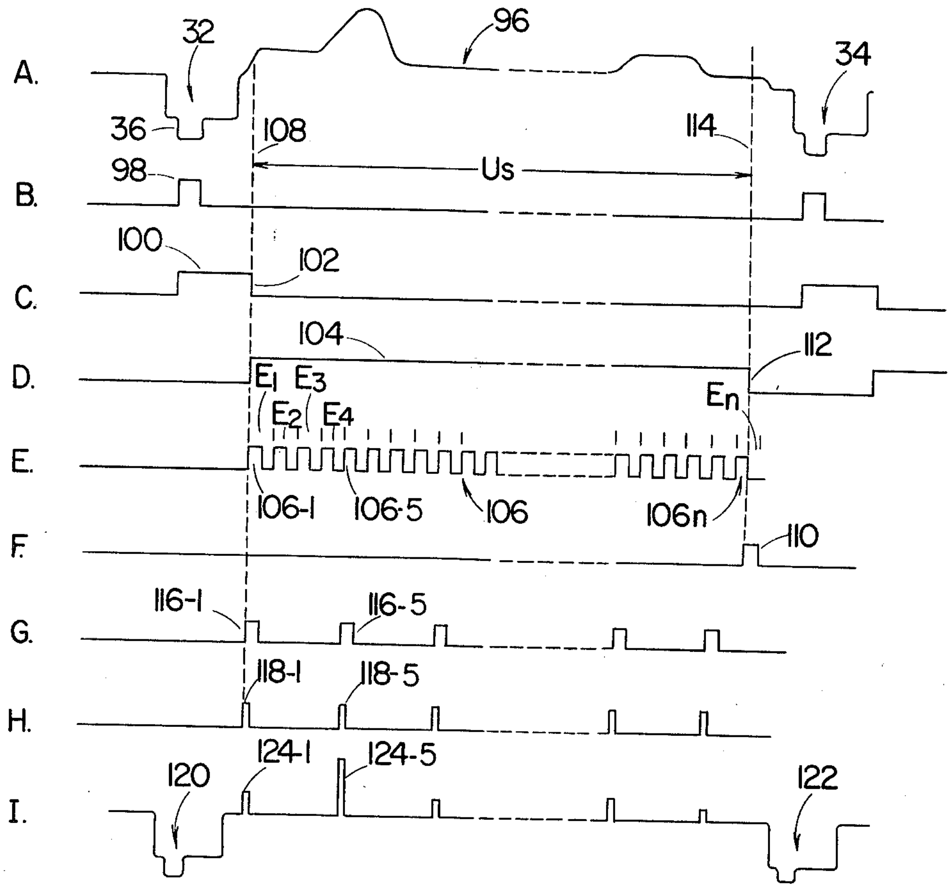
FIGS. 5A–I show wave forms found in the system of FIG. 4.

Referring now to FIG. 5 in addition to FIG. 4, in FIG. 5A there is shown a typical video signal provided by the camera apparatus 44 having line synchronizing pulses 32, 34 with an information-conveying signal 96 therebetween. The detected and separated line sync. pulse 98 is shown in FIG. 5B which triggers the monostable multivibrator 62 to provide the time delay pulse 100, the trailing edge 102 of the time delay pulse 100 setting the enable flip-flop 66 to initiate the enabling signal 104, as shown in FIG. 5D. Initiation of the enabling signal 104 starts the clock pulse generator 70 which thus generates the train of clock pulses as shown in FIG. 5E. It will be observed that the trailing edge 102 of the time delay pulse 100, and consequently the initiation of the enabling signal 104 and the train of clock pulses 106 occur at a time indicated by the dashed line 108 shortly after termination of the line sync. pulse 32.

It will be observed further that the period of the clock pulses 106 corresponds to the elements E, and thus that the desired number of elements $E_n$ corresponds to clock pulse $106_n$. The element counter 74 counts-down the clock pulses 106 and upon termination of the predetermined pulse *n* generates reset pulse 110 which terminates the enabling signal 104 as at 112, thereby to stop the clock pulse generator 70. It will be seen that *n* clock pulses 106 corresponding to *n* elements E have been generated by the instant shown by the dashed line 114 which is some-what prior to the next successive line synchronizing pulse 34, the interval between the instants 108 and 114 being the interval $U_s$.

In FIG. 5, it is assumed that the interlace counter 78 provides an output pulse 116 in response to every fourth clock pulse 106, taken cumulatively from line to line. Referring to FIG. 5G, it is here assumed that the interlace counter 78 has counted four clock pulses 106 at the end of the previous line and thus that clock pulse 106–1 is the fifth pulse resulting in the provision of an interlace pulse 116–1 in the output circuit 80 of interlace counter 78. Likewise, an interlace pulse 116–5 will be provided in response to the clock pulse 106–5 and so on. Sampling pulse generator 82 in turn generates narrow sampling pulses 118–1, 118–5, etc., in response to each interlace pulse 116–1, 116–5, etc., as shown in FIG. 5H.

Referring now to FIG. 5I, the line sync. pulse detected and separated by the sync. detector 56 actuates the sampling gate 90 to provide the line sync. pulses 120, 122 in the output video signal, the sampling pulses 118–1, 118–5, etc., likewise actuating the sampling gate 90 to pass the sampled video signal pulses 124–1, 124–5, etc.

In a specific embodiment of the invention for use with broadcast television having 525 lines per frame, 381 elements E and clock pulses 106 were employed with interlace ratios of 4, 8, 16 and 32, i.e., with the factor K by which the interlace counter 78 divides the clock pulses 106 being 4, 8, 16 or 32. It will be observed that although the entire usable portion U of the line is sampled from sync. pulse to sync. pulse, the interlace is preserved since the clock pulse generator 70 is started at exactly the same point 108 in each line and turned off an exact number $n$ of video elements later by the element counter 74.

It will now be seen that any particular frame of the video information contains only ¼, ⅛, 1/16 or 1/32 of the complete video information provided by the camera apparatus 44. However, after 4, 8, 16 or 32 frames, as the case may be, all the information which would normally have been contained in a single frame of unsampled pulses is transmitted. Thus, the required bandwidth of the transmission facility 46 need only be ¼, ⅛, 1/16 or 1/32, as the case may be, of that required where all the information is transmitted in a single frame.

Recalling now the psycho-physical characteristics of the human eye and its finite ability to assimilate information, even though only ¼, ⅛, 1/16 or 1/32 of the video information is transmitted each frame, the information presented to the eye is sufficient so that the transmitted picture is seen.

Figure 6:
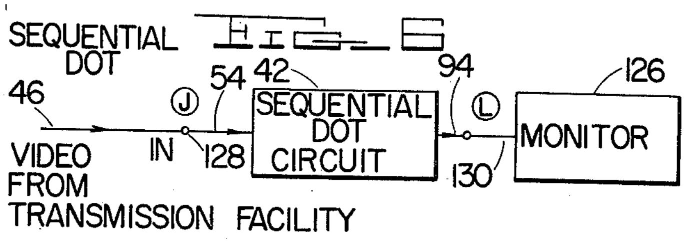
FIG. 6 is a schematic block diagram showing the receiving station.

Assuming that the receiver or monitor, which as indicated may be conventional in every respect, is positioned adjacent the transmitter so that the transmission facility 46 is relatively short, i.e., so that its impedance characteristics are relatively insignificant, a conventional receiver may be directly coupled to the transmission facility 46 and will directly display the transmitted sampled video signals. However, if the transmission facility is of appreciable length, and particularly if it is of the low pass-type, the sampled video signal pulses 124 will deteriorate to a certain extent so that if applied directly to the monitor, the displayed image would be objectionable for human viewing. However, this condition may be corrected by simply sampling the received video signal at the receiver at the same rate as it was sampled at the transmitter, thus accurately reconstructing the picture. Thus, referring to FIG. 6, a sequential dot interlace system 42, identical to that employed at the transmitting station as shown in FIG. 4 may simply be connected between the transmission facility 46 and the monitor 126, the input circuit 54 of the sequential dot interlace system 42 being coupled to the terminal end 128 of the transmission facility 46, the output circuit 94 being coupled to the antenna or input circuit 130 of the monitor 126.

It will be readily apparent to those skilled in the art that there are numerous systems and methods available for transmitting the sampled video signal from the sequential dot interlace generating system 42 to the receiver or monitor, such transmission systems and methods forming no part of the present invention.

Figure 7:
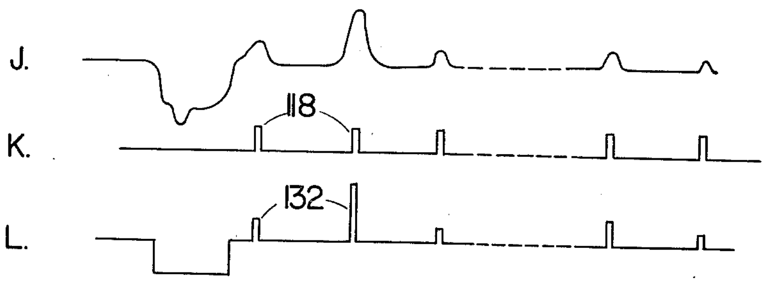
FIGS. 7J–L show wave forms found in the system of FIG. 6.

Referring briefly to FIG. 7, the distorted video signal received at the terminal end 128 of the transmission facility 46 is shown in FIG. 7J, the sampling pulses 118 provided by the sequential dot interlace circuit 42 at the receiving station are shown at FIG. 7K, and the resultant resampled video signal pulses 132 applied to the input circuit 130 of the monitor 126 are shown in FIG. 7L.

It will now be understood that the display on the monitor 126 is in the form of discreet dots, rather than the lines to which the average person is accustomed. However, at the lower interlace ratios, particularly 4:1, the display is excellent and very closely resembles the conventional line display. However, with higher interlace ratios, one of the objectionable sensations experienced when observing the reconstructed sequential dot television image is the apparent creeping or crawling of the dots across the face of the tube. This crawling effect occurs because the sequential motion of the interlace provided by the basic system of FIG. 4 is always in the same direction, this direction depending upon the remainder integer previously referred to, i.e., with 381 elements E per line and an interlace ratio of 4:1, 4 is divisible into 381 by 95 with a remainder of 1 whereas with 383 elements E 4 is still divisible into 383 by 95 but the remainder integer is 3.

Figure 8:
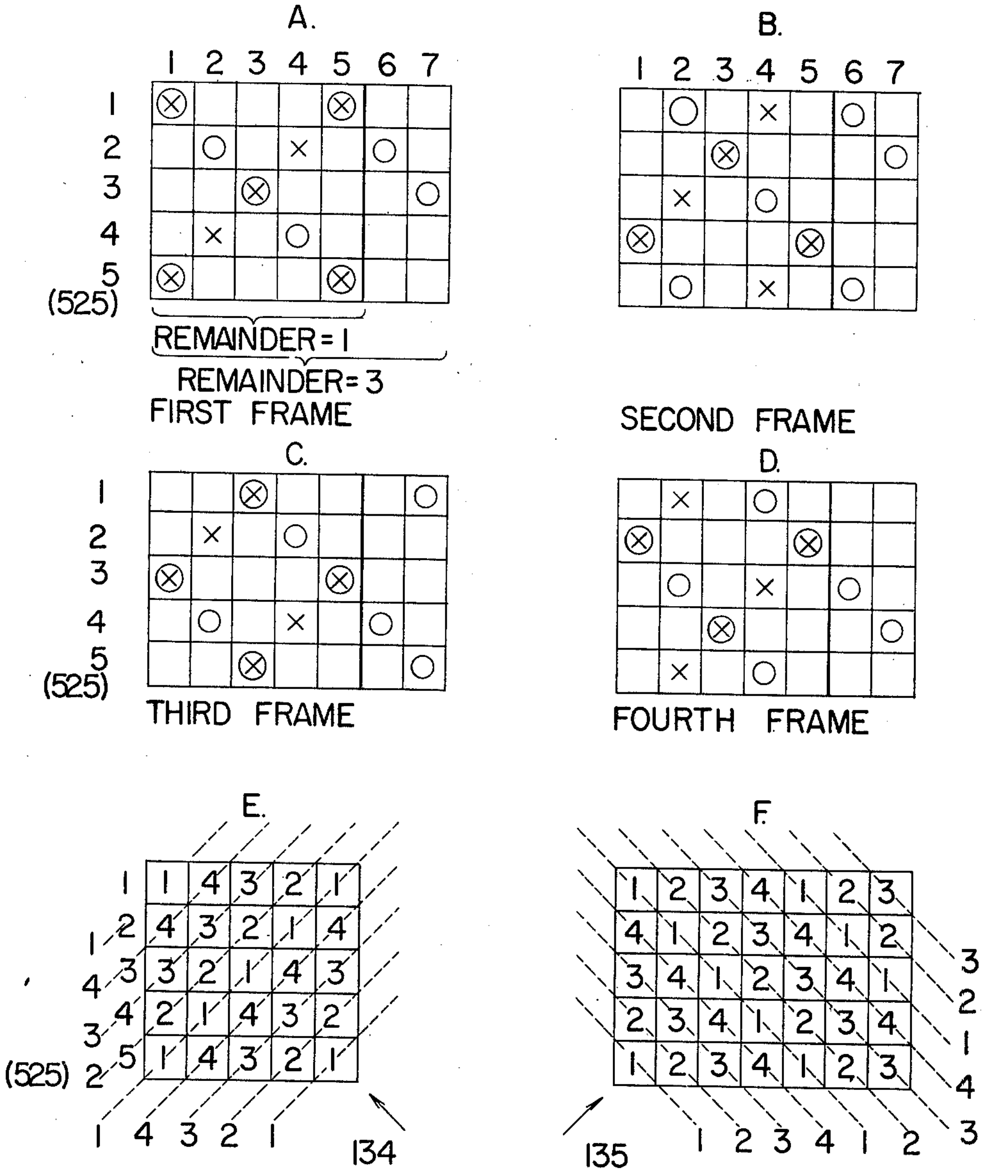
FIGS. 8A–F are simplified five line by five or seven element diagrams useful in explaining the dot creeping characteristic found in sequential dot interlacing.

Referring now to FIGS. 8A–D, sampled five line diagrams are shown having both five and seven elements per line, thus with a 4:1 interlace ratio, providing a remainder of 1 and a remainder of 3, respectively; no vertical interlace is shown in the diagrams of FIG. 8 and thus the scanning progresses from one line to the next successively, i.e., from line 1 to line 2, from line 2 to line 3, et seq. In FIG. 8, the elements sampled when five elements per line are provided are shown by X while the elements sampled in a seven element line are shown by O. Thus, it is seen that with a five element line, i.e., a remainder of 1, the first and fifth element are sampled in the first line, the fourth in the second, the third in the third line, the second in the fourth line and the first and fifth in the fifth line of the first frame, while with a seven element line, i.e., a remainder of 3, the first and fifth elements are again sampled in the first line, the second and sixth in the second line, the third and seventh in the third line, the fourth in the fourth line and the first and fifth again in the fifth line of the first frame. It will be thus be seen that with a five element line, the elements sampled in the first frame fall in a straight diagonal line extending from the fifth element of the first line to the first element in the fifth line, whereas, the elements sampled in the first frame with seven elements extend in a straight diagonal line in the opposite direction extending from the first element of the first line to the fifth element of the fifth line.

Referring now additionally to FIG. 8E, the elements sampled during four frames with five elements per line are shown. It will be observed that the elements sampled in the first, second, third and fourth frames respectively fall on the diagonals indicated by the dashed lines numbers 1, 2, 3, and 4 which extend upwardly from left to right, the progression from frame to frame being diagonally upwardly from right to left as shown by the arrow 134. However, referring additionally to FIG. 8F in which the elements sampled in all four frames with seven elements per line are shown, it will likewise be observed that the elements scanned in the first, second, third and fourth lines fall on the diagonals indicated by the dashed lines similarly numbered which extend upwardly from right to left, the progression in this case being diagonally upwardly from left to right as shown by the arrow 135. It will thus be seen that the direction in which the dot pattern crawls and the angle of dots in the illusion depends upon the particular odd number of remainder elements in a line.

Figure 9:
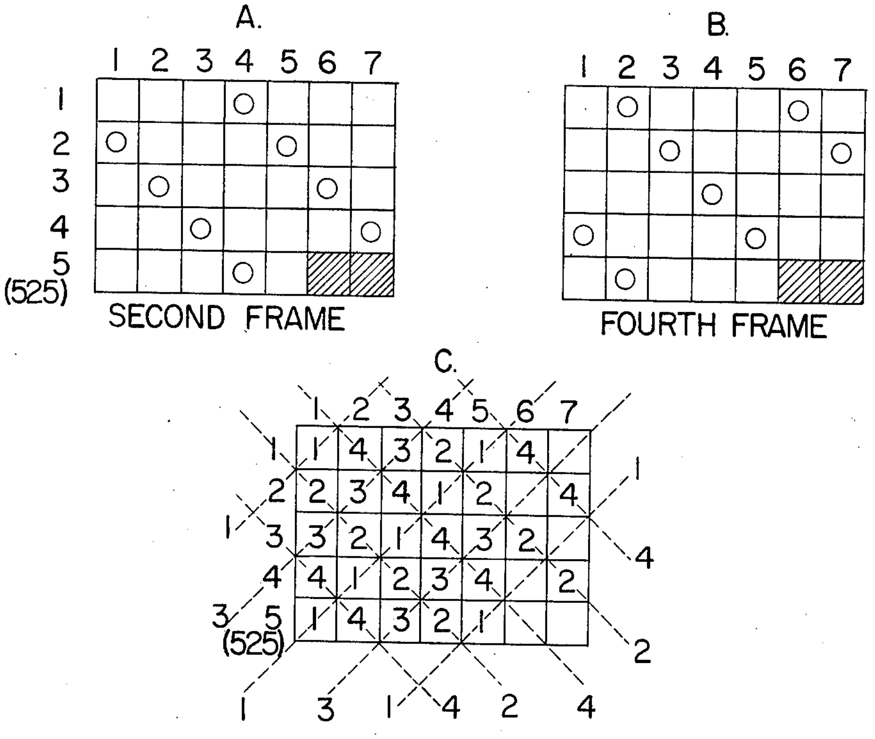
FIGS. 9A–C are simplified five line by seven element diagrams useful in explaining the embodiment of the invention which eliminates dot creeping.

It will be observed that if the net displacement of the dot patterns is made zero, the crawling illusion would vanish. This is accomplished, in accordance with the invention, by alternating the number of elements, and thus the number of remainder elements in successive frames so that each successive frame has the dots moving in the opposite direction, thus creating a net zero displacement. In order to provide this alternation of elements in a line, however, it is necessary to provide the same number of elements in the last line of each frame, be it the larger or smaller number in order to provide the proper interlace. Referring now to FIGS. 9A and B in addition to FIGS. 8A and C, in which five line by five element (FIGS. 8A and C) and five line by seven element (FIGS. 9A and B) simplified diagrams are shown for the first through fourth frames with a 4:1 interlace ratio, in the first frame, as shown in FIG. 8A, five elements are employed (with a remainder integer of one) thus providing the element sampling pattern indicated by X. At the end of the first frame, the system is converted to employ seven elements per line as shown in FIG. 9A, the sampled elements being indicated by O. At the end of the fifth element of the fifth line, the system is again converted to five elements per line and the third frame is then sampled as indicated by X in FIG. 8C. At the end of the third frame, the system is then again converted to seven elements per line with the sampling as shown by O in FIG. 9B. At the end of the fifth element of the fifth line of the fourth frame, the system is again converted to the sampling of five elements per line with the fifth (or first) frame again being sampled as indicated by X in FIG. 8A.

This alternation of the number of elements per line, and thus the number of remainder elements, in successive frames results in the dot pattern shown in FIG. 9C. Here it will be observed that the elements sampled in the first and third frames fall in diagonal lines extending upwardly from left to right while the elements scanned in the second and fourth frames fall in diagonal lines extending upwardly from right to left. Thus, the net displacement of the dots in the horizontal axis after every two frames is zero with the result that the dot crawling illusion is eliminated from the display.

Figure 10:
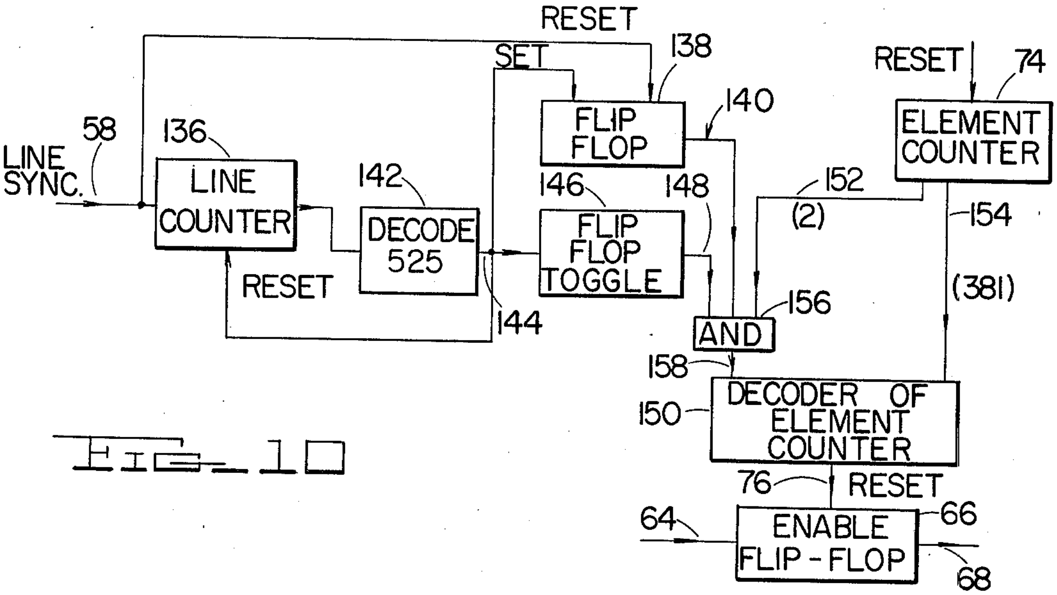
FIG. 10 is a fragmentary schematic block diagram illustrating a dot creeping-prevention portion of the system of the invention.

Referring to FIG. 10 in which like elements are indicated by like reference numerals, there is shown a system for accomplishing the above-described alternation of remainder elements in successive frames. Here, a conventional counter circuit 136 is provided coupled to the line sync. output circuit 58 for counting the line sync. pulses and thus the number of lines, and coupled to the "reset" circuit of flip-flop 138 to reset the same. Line counter 136 includes a decoding element 142 which provides in its output circuit 144 a signal in response to the last line, i.e., line 525 in a conventional 525 line system. Output circuit 144 of line 525 decoding element 142 is coupled to the "reset" input circuit of the line counter 136 to reset the same, the "set" circuit of flip-flop 138 to set the same, and also to a conventional flip-flop toggle circuit 146 which provides in its output circuit 148 a "one" signal in response to every other last line and a "zero" signal in response to the intermediate last lines, i.e., a "one" signal in response to the first line 525, a "zero" signal in response to the second line 525, etc.

Element counter 74 includes a decoding element 150 receiving signals responsive to a count of 381 clock pulses in line 154. Output circuit 140 of flip-flop circuit 138, output circuit 148 of the flip-flop toggle circuit 146, and element 2 line 152 of the element counter 74 are coupled to a conventional "AND" circuit 156 which has its output circuit 158 coupled to the decoding element 150 of the element counter 74 which in combination with element 381 line 154, makes decoding element 150 also responsive to a count of 383 clock pulses. Output circuit 76 of the decoding element 150 is coupled to the "reset" input circuit of the enable flip-flop 66.

Starting now with the first frame, when the line counter 136 has counted down 525 line sync. pulses and thus 525 lines, flip-flop circuit 138 is "set" and provides an output signal in its output circuit 140, that signal being applied to the AND circuit 156 to inhibit that circuit and continuing until the next line sync. pulse is received to reset flip-flop 138, which is line 1 of the second frame. A signal is provided in line 154 whenever the element counter 74 has counted-down 381 clock pulses, that signal being applied to the decoder circuit 150 and persisting until the element counter 74 is reset. Thus, a signal is applied by output circuit 140 to the AND circuit 156 during the last line of each frame to inhibit that circuit so that there always occurs a clock pulse count of 381 in line 525 of each frame. Flip-flop toggle 146 is in its "zero" state during the first frame and the signal in output circuit 144 from the line 525 decoding element 142 in response to line 525 of the first frame causes the flip-flop toggle 146 to change to its "one" state, thus applying a signal on line 148 to the AND circuit 156, which in turn applies a signal in its output circuit 158 to the decoding element 150 of the element counter 74 to make the decoding element now responsive to a count of 383 during the second frame. Thus, during the first 524 lines in the second frame, 383 clock pulses and thus elements E are provided in each line.

At the start of line 525 of the second frame, a signal is provided in output circuit 140 of the flip-flop circuit 138 which is applied to the AND circuit 156 to inhibit that circuit so that decoding element 150 is caused to switch from the decoding of a pulse count of 383 to the decoding of a pulse count of 381, this providing the resetting pulse 110 in its output circuit 76 in response to the 381 clock pulse in line 525. At line 525 of the second frame, a signal is provided in output circuit 144 of the line 525 decoding element 142 which triggers the flip-flop toggle circuit 146 to return it to its "zero" state thus removing the signal from output circuit 148 and the "AND" circuit 156, and thus restoring the conditions which prevailed at the beginning of the first line of the first frame.

Figure 11:
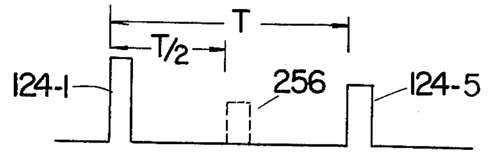
FIG. 11 is a diagram illustrating insertion of a pulse between adjacent transmitted interlacing pulses for improving the visual characteristics of the displayed picture.

As indicated heretofore, one of the discomforting aspects of the sequential dot display is the crawling dot pattern which is actually an illusion due to the time and position displacement of the dots on the screen. This illusion becomes less obvious and therefore less objectionable as the interlace ratio is decreased. It is generally accepted that television images contain a great amount of redundant information. Thus, the sequential dot display image may be enhanced by inserting at the receiver video signal elements between the received sampled video elements. I have found that the insertion of video signal elements having an arbitrary grey level between the received video signal samples, while decreasing the contrast of the displayed image, enhances the image. Referring to FIG. 11 in which two received sampled video signal pulses 124–1 and 124–5 are shown having a period T, a pulse having an arbitrary, predetermined grey level, shown in dashed lines at 256 may be inserted midway between the received sample video pulses, 124–1 and 124–5, i.e., at a time $T/2$ in the manner shown in FIG. 12. Here, output circuit 94 is coupled to a summing circuit 258 and also to a delay device 260, which may be a conventional monostable multivibrator providing the delay $T/2$. The output circuit 262 of the delay multivibrator 260 is coupled to pulse generator 264 which generates the inserted pulse 256 having a predetermined amplitude or grey level. Output circuit 266 of the pulse generator 264 is also coupled to the summing circuit 258 which has its output circuit 268 coupled to the monitor 126.

Figure 12:
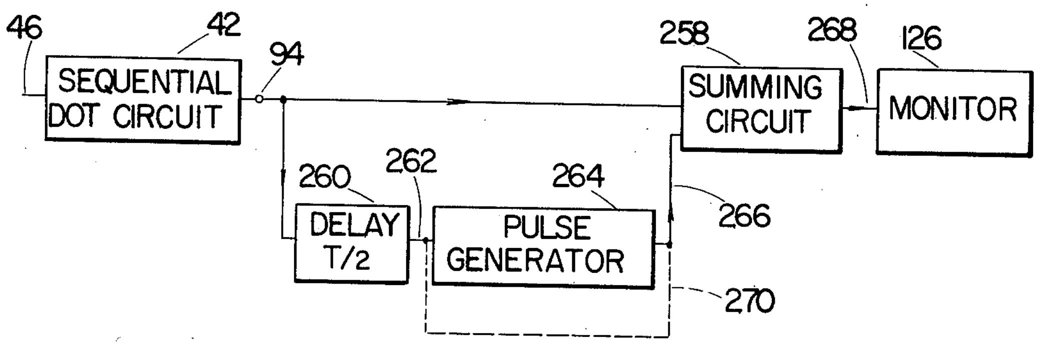
FIG. 12 is a fragmentary schematic block diagram showing the system for inserting the pulse of FIG. 11.

The contrast may be improved while still enhancing the quality of the image by inserting a pulse having a desired predetermined relationship to the preceding pulse by inserting the desired amplification or attenuation in the connection shown in dashed lines 270 in FIG. 12.

Figure 13:
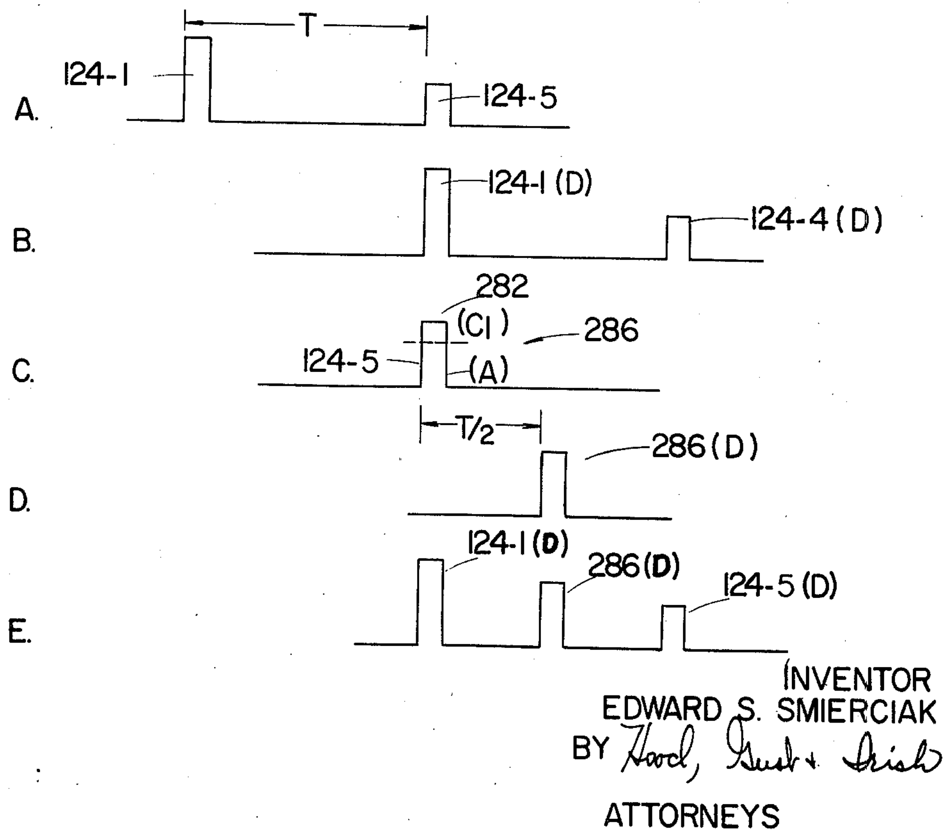
FIGS. 13A–E are diagrams illustrating another method of inserting pulses for improving the visual characteristics of the displayed picture.
Figures 14, 15, 17:
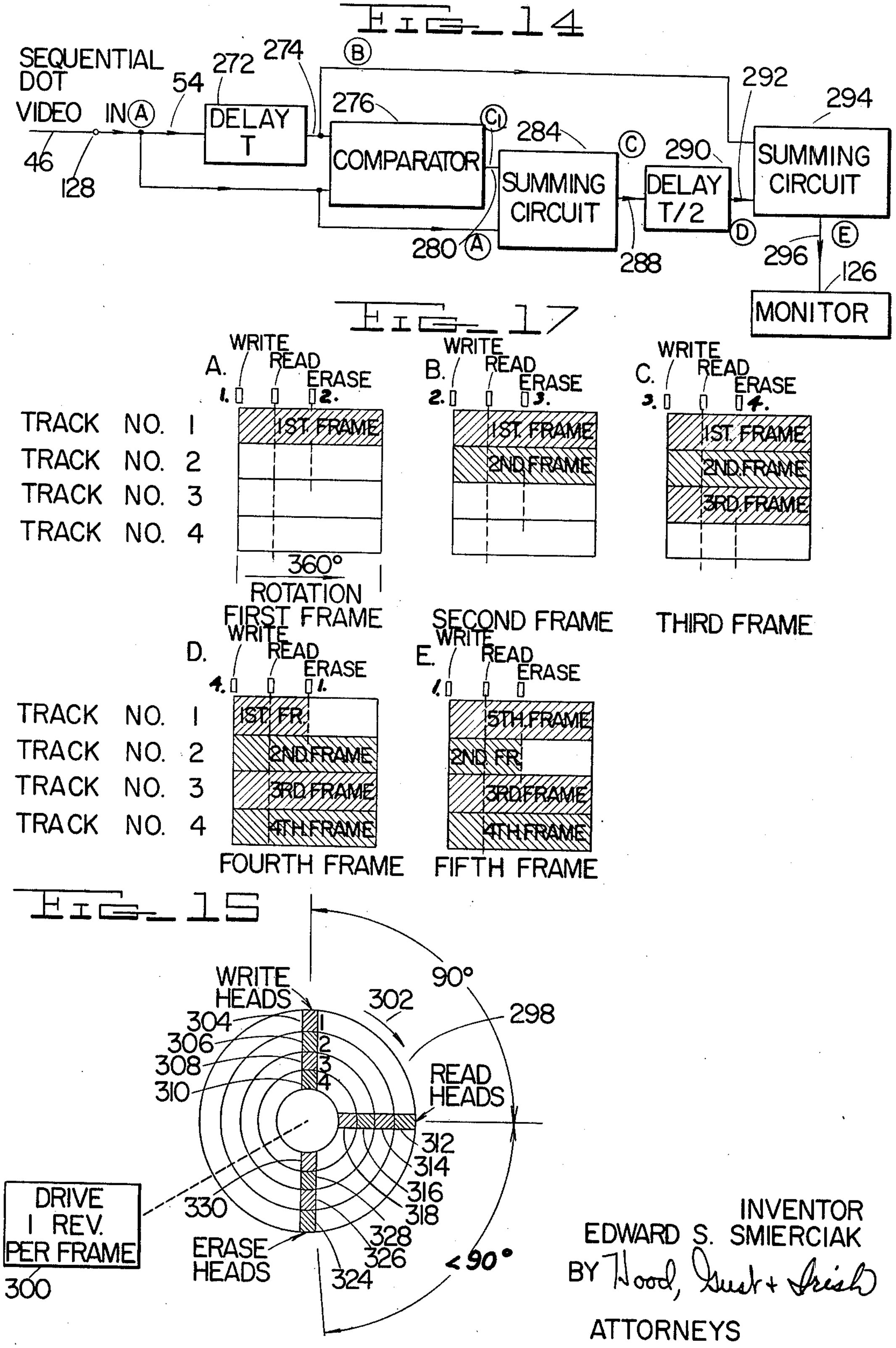
FIG. 14 is a fragmentary schematic diagram illustrating the system for inserting pulses in accordance with the method shown in FIG. 13.
FIG. 15 is a schematic diagram showing a video disc for sequentially recording the interlacing signals transmitted during each frame and for simultaneously reading out the recorded signals to provide a reconstructed line-type display.
Figure 15:
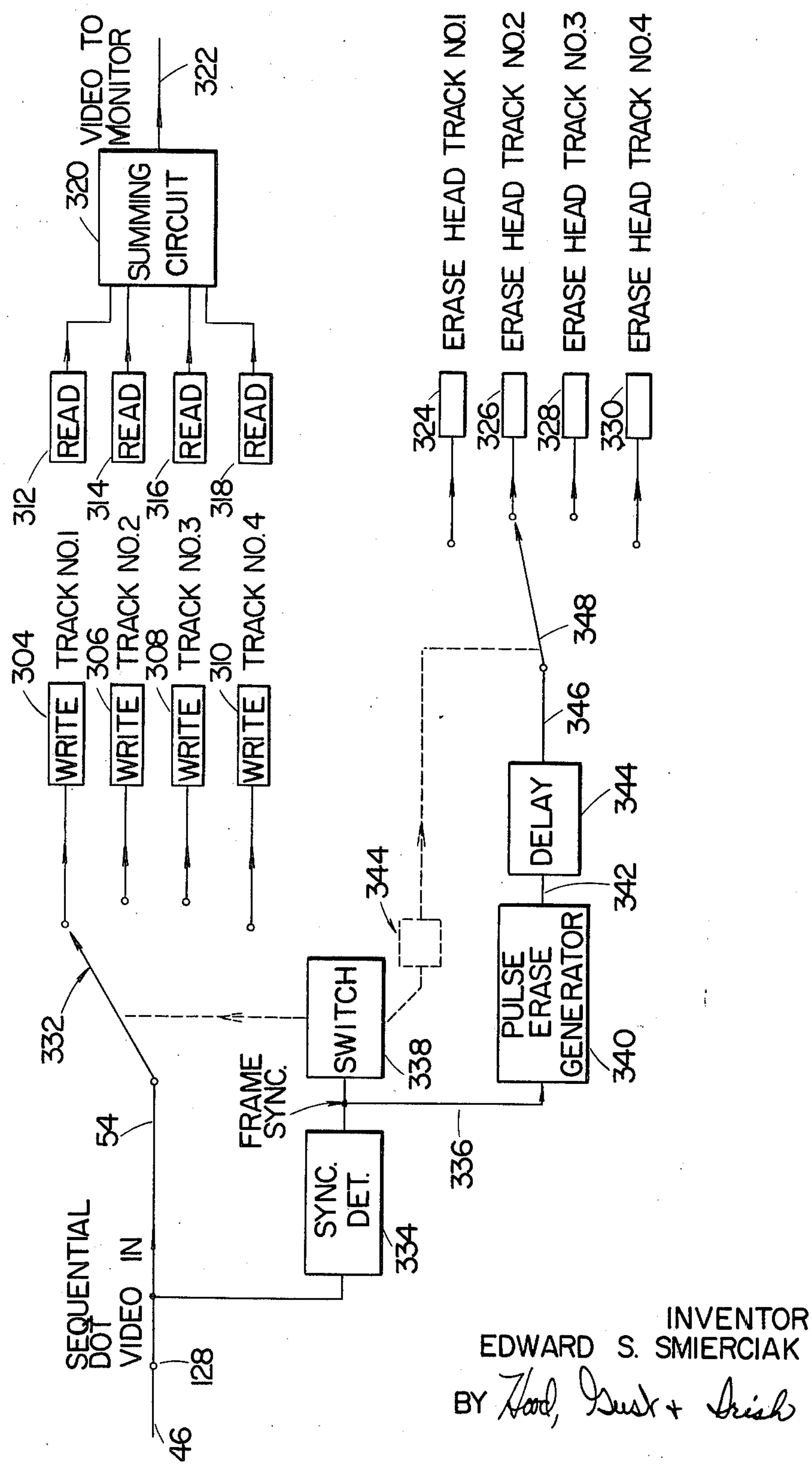

Another arrangement for enhancement of the sequential dot display by insertion of video signals between the received sampled video signal pulses is shown in FIGS. 13 and 14. Here, the inserted pulses have an amplitude which is dependent on the amplitude of the immediately preceding and succeeding pulse. In FIG. 13A, two successive received sampled video signal pulses 124–1 and 124–5 are shown having a period T. Input circuit 54 is coupled to a delay line 272 which delays the sampled video signal pulses by the period T, as shown in FIG. 13B, the thus delayed received, sampled video signal pulses being shown at 124–1(D) and 124–5(D). The output circuit 274 of delay line 272 is coupled to a conventional comparator circuit 276, input circuit 54 being also directly connected to the comparator 276, as shown. Comparator 276, which may be a differential amplifier, provides a signal in its output circuit 280 having an amplitude responsive to the difference between the amplitudes of the undelayed pulse 124–5 and the delayed pulse 124–1(D), as shown at 282 in FIG. 13C. Output circuit 280 and input circuit 54 are also both coupled to conventional summing circuit 284 which thus adds the difference pulse 282 to the undelayed pulse 124–5 to provide a resulting pulse 286 having an amplitude which is dependent on the amplitudes of the original sampled video pulses 124–1 and 124–5. The output circuit 288 of the summing circuit 284 is coupled to delay line 290 which thus delays the dependent amplitude pulse 286 by $T/2$, as shown at 286(D) in FIG. 13D. Output circuit 274 of the delay line 272 and the output circuit 292 of delay line 290 are both coupled to conventional summing circuit 294 which has its output circuit 296 coupled to the monitor 126 with the result that the delayed dependent amplitude pulse 286(D) is inserted between the delayed sampled video signal pulses 124–1(D) and 124–5(D) as shown in FIG. 13E.

As indicated heretofore, by reason of the transmission of sampled video signal pulses during each frame and reliance upon the psycho-physical characteristics of the eye to receive sufficient information to see the image, the display on the monitor as viewed by the eye is in a dot pattern, whereas the average individual is accustomed to a line-type display. The display may be enhanced so that the line-type display is approached by the use of long persistence phosphors corresponding to the interlace ratio. Thus, a P–7 phosphor enhances the display with an 8:1 interlace ratio. The line-type display can be reconstructed by the employment of a storage device having rectilinear characteristics, i.e., one which provides an output signal which is 100 percent of the input signal for a prescribed number of frames, i.e., the interlace ratio. Such a storage device employed at the receiving station will thus permit storage of each single frame of a dot interlace image for the specific number of frames required for complete interlace before updating and thus, the final output display will be the same as a line-type display of the original image. This storage may be accomplished by the use of a multi-track video disc recorder and switching system as shown in FIGS. 15, 16, 17. Here, in the case of a 4:1 interlace ratio, a conventional video disc recorder 298 is employed having four tracks or channels, the video disc 298 being driven by a conventional drive motor 300 at a speed one revolution per frame in the direction shown by the arrow 302. Four writing heads 304, 306, 308 and 310 are provided for the four tracks. Displaced from the write heads in the direction of rotation 302, the displacement being 90° in the illustrated embodiment are four read heads 312, 314, 316 and 318, all connected to a conventional summing circuit 320 which has its output circuit 322 coupled to the monitor. Four erasing heads 324, 326, 328, 330 are also provided for the four tracks, respectively, and are displaced from the reading heads in the direction of rotation 302 by less than 90° in the illustrated embodiment Input circuit 54 is coupled to a conventional electronic switch, shown schematically at 332, which sequentially couples the received, sampled video signal pulses to the writing heads 304, 306, 308 and 310. Input circuit 54 is also coupled to sync. detector and separator 334 which has a frames sync. pulse output circuit 336 which is coupled to the actuating circuit 338 of the switch 332. Thus, during the first frame, input circuit 54 is coupled by a switch 332 to write head 304 associated with the first track of the video disc recorder 298, during the second frame the input circuit 54 is coupled to the write head 306 associated with the second track, etc.

The frame sync. pulse output circuit 336 is also coupled to a conventional erase pulse generator 340 which has its output circuit 342 coupled to a suitable delay circuit 344, which in turn has its output circuit 346 sequentially coupled to the erase heads 324, 326, 328 and 330 by electronic switch 348 which is also actuated by the switch actuating circuit 338 through delay 345 which delays the erase pulses by a time sufficient to permit advance of a particular incremental section of information recorded on the particular track from the respective write head to and beyond the respective reading head.

Referring now particularly to FIGS. 17A through E, FIG. 17A shows the condition of the video recording disc 298 at the end of the first frame, i.e., at the end of one complete revolution, FIG. 17B shows the condition of the disc at the end of the second frame, while FIGS. 17C, D and E respectively show the conditions of the disc at the end of the third, fourth and fifth frames. At the beginning of the first frame, switch 332 couples input circuit 54 to writing head 304 associated with track No. 1, while switch 348 couples erase pulse generator 340 and delay line 344 to erase head 326 associated with track No. 2. Assuming that all of the tracks had been previously erased, at the end of the first frame, the sequential dot video information for the first frame will have been recorded on track No. 1 of the video disc 298, as shown, application of the erase pulse to the erase head 326 associated with track No. 2 having no effect. At the end of the first revolution of the video disc recorder 298, reading head 312 will have picked up and read out to the monitor the video information appearing on track No. 1. At the end of the first frame, switch 332 now connects input circuit 54 to write head 306 associated with track No. 2 while switch 348 connects the erase pulse generator 340 and delay line 344 to erase head 328 associated with track No. 3. Thus, at the end of the second frame, the sequential dot video information transmitted during the second frame has been recorded on track No. 2, the sequential dot information of the first frame remaining recorded on track No. 1, as shown in FIG. 17B. Again, with track No. 3 being previously erased, excitation of erase head 328 associated with track No. 3 has no effect. At the end of the second frame, read-heads 312 and 314 will have simultaneously picked up and read out to the monitor the sequential dot video information recorded on tracks Nos. 1 and 2.

At the end of the second frame, switch 332 connects input circuit 54 to write head 308 associated with track No. 3 while switch 348 couples the erase pulse generator 340 and delay line 344 to erase head No. 330 associated with track No. 4. Thus, at the end of the third frame, the sequential dot video information transmitted in the third frame has been recorded on track No. 3 while the sequential dot video information transmitted during the first and second frames remains recorded on tracks Nos. 1 and 2 and the read heads 312, 314 and 316 have simultaneously picked up and read out to the monitor the video signal information recorded on tracks Nos. 1, 2 and 3. Again, with track No. 4 previously erased, energization of erase head 330 associated with track No. 4 is of no effect.

At the end of the third frame, switch 332 couples input circuit 54 to write-head 310 associated with track No. 4 while switch 348 connects the erase pulse generator 340 and delay line 344 to erase head No. 324 associated with track No. 1. It will now be observed that as the video disc recorder 298 rotates during the fourth frame, the sequential dot video information transmitted during the fourth frame is written on the fourth track with all four read-heads picking up and reading out the storage sequential dot video information on each track, thus simultaneously displaying all of the video signal information on the monitor. It will now be observed further that the sequential dot video signal information for the first frame stored in track No. 1 three frames previously is advanced past read-head 312 and then past erase head 324 so that at the end of the fourth frame, more than 180° of sequential dot video signal information has been erased from track No. 1. At the beginning of the fifth frame, switch 338 now again connects input circuit 54 to write head 304 and switch 348 to erase head number 326. Thus, the fifth frame of sequential dot video information is written into track No. 1 following erasure of the sequential dot video information stored therein in the first frame.

It will now be seen that with the video disc recorded arrangement shown in FIGS. 15, 16 and 17, the sequential dot video information sequentially transmitted during each frame is sequentially recorded on the separate tracks of the disc recorder 298, being simultaneously read out to the monitor during the fourth frame and with the video information being updated frame by frame. It should here be pointed out that actuation of the switch 348 by the switch actuating circuit 338 is delayed 344 for less than 180° of rotation of the disc 298 from actuation of the switch 332 so that erasure of the sequential dot video information recorded four frames previously on a respective track continues while the video signal information of the current frame is being recorded on the respective track.

It will be readily apparent that an endless loop video tape recorder having the same number of tracks as the interlace ratio may be employed rather than the video disc recorder of FIG. 15, the tape being advanced one complete length or cycle each frame. In either case, with the successive frames of video information in sequential dot format being continuosuly summed, the video output to the monitor will be identical to the video output from the camera and free of any dot structure. It will be observed that the video disc recorder or loop tape recorder provides a storage element with an ideal characteristic, i.e., 100 percent output during the number of frames of the interlace ratio and zero output thereafter. It will further be readily understood that the switches 332, 348 schematically shown in FIG. 16 may take the form of "AND" gates with the switch actuating circuit 338 then being a gate generator, such as a shift register, responsive to the frame sync. pulses.

Figure 18:
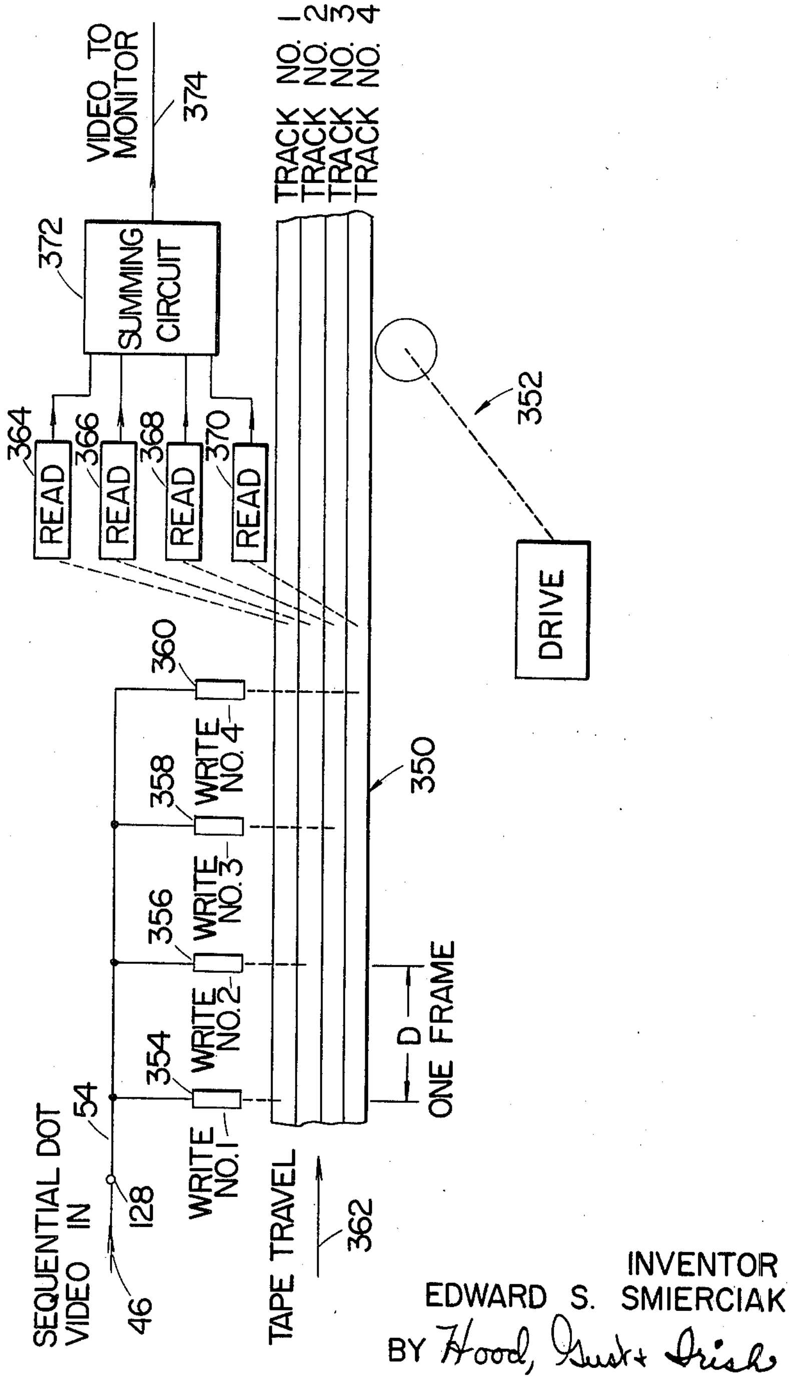
FIG. 18 is a schematic diagram showing another recording system.

Referring now to FIG. 18, another storage or integrating arrangement for reconstruction of a line-type image from the sequential dot image is shown, this arrangement employing an ordinary video magnetic tape. Here, a conventional video tape 350 is provided advanced by a conventional drive mechanism 352. In a sequential dot system having a 4:1 interlace ratio, four recording heads 354, 356, 358 and 360 are employed arranged to record on respective tracks of the tape 350 but respectively spaced apart in the direction of tape movement, as shown by the arrow 362, by the distance D the tape is advanced during one frame. All of the recording heads 354, 356, 358 and 360 are coupled to the input circuit 54 so that each of them receives the sequential dot video signal transmitted each frame and records it upon its respective tape track.

Four pick-up heads 364, 366, 368 and 370 are provided respectively arranged to read-out or pick up the recorded information on a respective track, the four pick-up heads being disposed in transverse alignment at right angles to the direction of tape movement. The four pick-up heads are connected to a conventional summing circuit 372 which has its output circuit 374 coupled to the monitor.

Figure 19:
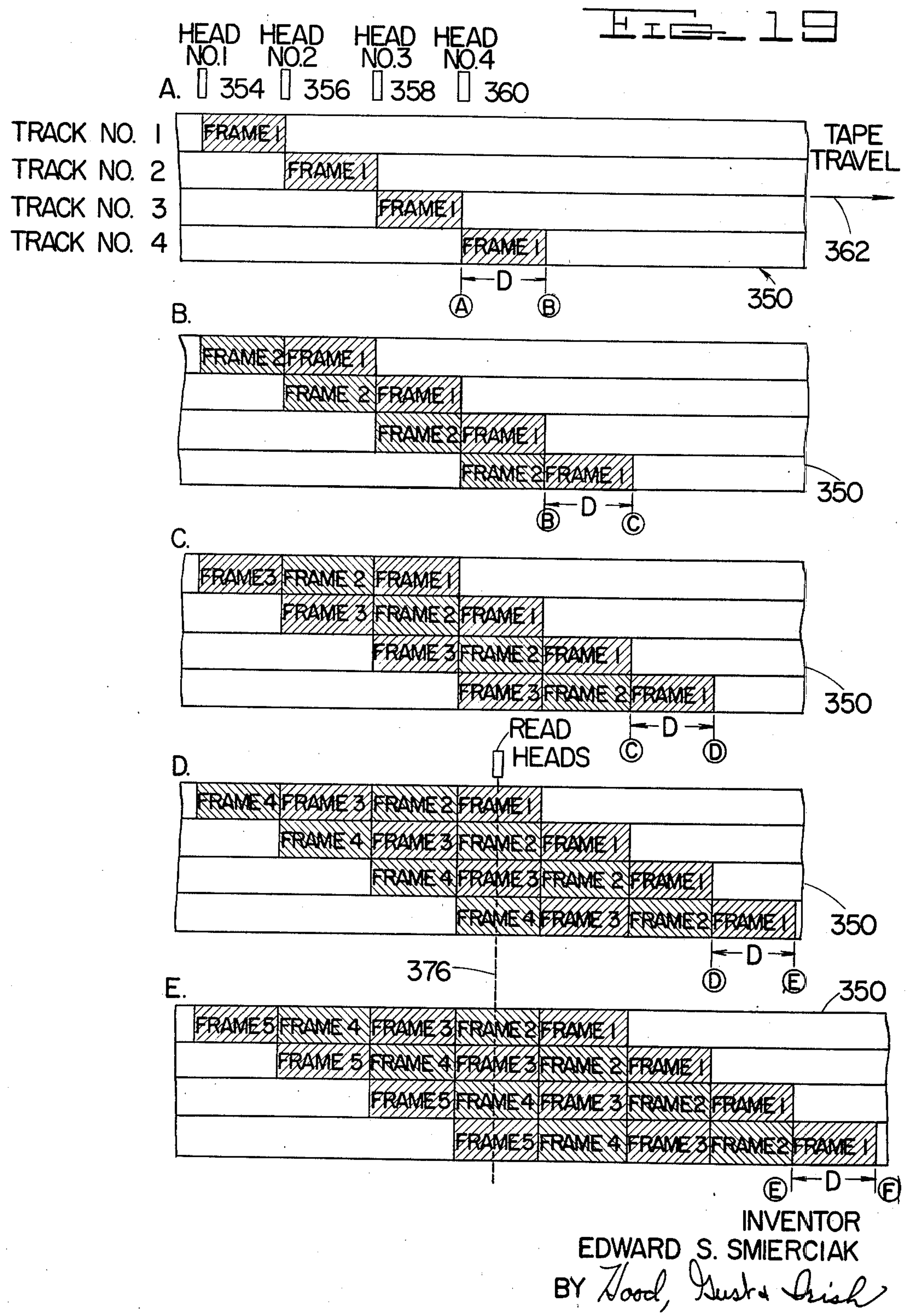
FIGS. 19A–E are diagrams useful in explaining the system of FIG. 18.

Referring now additionally to FIG. 19A, the tape 350 is shown in its condition after transmittal of the first frame of sequential dot video information, i.e., after advancing distance D from point A to B. Recalling that the sequential dot video information is simultaneously coupled to each of the recording heads, it will be observed that the sequential dot video information for the first frame has been recorded on each of the four tracks, the four frames of recorded information being staggered along the tape in the direction of tape advance by reason of the aforesaid spacing of the recorded heads. Inspection of FIG. 19B which shows the condition of the tape at the end of the second frame, the tape having advanced by a distance D from point B to point C, shows that the second frame of sequential dot video information has likewise been recorded on each track immediately following the first frame. Inspection of FIGS. 19C and D which respectively show the condition of the tape 350 at the end of the third and fourth frames will reveal that at the end of the fourth frame, all four frames of sequential dot video information have been successively recorded on each track of the tape 350 and by reason of the spaced-apart relationship of the recording heads 354, 356, 358 and 360 by the distance D, the first, second, third and fourth recorded frames of sequential dot video information now appear in transverse alignment, as shown by the dashed line 376. It will thus be seen with the pick-up heads 364, 366, 368 and 370 disposed in transverse alignment with respect to the direction of movement of the tape 350 and spaced from the last recording head 360 in the direction of movement of the tape, as the tape advances past the last recording head 360, all four frames of recorded sequential dot video information will pass under the pick-up heads which will then simultaneously read out the recorded video information to the summing circuit 372 and hence to the monitor.

Referring now to FIG. 19E, which shows the condition of the tape at the end of the fifth frame, it will now be observed that at the pick-up head position, the second, third, fourth and fifth frame recorded sequential dot video information appears in alignment for reading out by the pick-up heads. In this fashion, the video signal information is updated each frame as the tape advances. It will be readily understood that the tape 350 may also be in the form of an endless loop with erasing heads provided for erasing the recorded information spaced from the pick-up heads in the direction of tape movement. It will again be observed that after the first four frames have been recorded, the summed output of the four tracks provides a complete line-type display rather than one of the sequential dot format. It will be readily understood that the system may be employed with higher interlace ratios by the provision of additional tracks, recording heads and pick-up heads. It will further be readily understood that the four recording heads may be disposed in transverse alignment with respect to the direction of tape movement and the four pick-up heads respectively spaced-apart in the direction of tape movement by the distance D the tape has advanced each frame. It will be seen that the integrating system of FIG. 18 eliminates the need for a signal switching apparatus.

While there have been described above the principles of this invention in connection with specific apparatus, it is to be clearly understood that this description is made only by way of example and not as a limitation to the scope of the invention.

What is claimed is:

1. In a raster-type television system including input circuit means for receiving a time-based video signal having recurrent line and frame synchronizing pulses, there being a predetermined number of lines in each frame, said signal including an information conveying portion having a predetermined minimum duration interval between said line synchronizing pulses: a sequential dot interlace system comprising selectively actuable means for generating a train of clock pulses; means responsive to a respective line synchronizing pulse for actuating said clock pulse generating means adjacent to the start of the respective signal portion; first means for counting said clock pulses and for deactuating said clock pulse generating means in response to a first predetermined integral number of clock pulses generated during a said interval: second means for cumulatively counting said clock pulses from line to line and for providing a train of sampling pulses respectively in response to each successive group of a second predetermined number of said clock pulses, said second number being divisible into said first number by a first integer with a second integer remainder, said number of lines, said first predetermined number of clock pulses, and said remainder integer being of one numerical quality, said quality being odd or even, and said second predetermined number being of the other numerical quality; output circuit means; and means for coupling said output and input circuit means in response to said sampling pulses thereby to provide a train of sampled video signal pulses in said output circuit means.

2. The system of claim 1 wherein said number of lines, said first predetermined number of clock pulses, and said remainder integer are odd, and said second predetermined number is even.

3. The system of claim 1 wherein said number of lines, said first predetermined number of clock pulses, and said remainder integer are even, and said second predetermined number is odd.

4. The system of claim 1 wherein said actuating means includes means for detecting the respective line synchronizing pulse and for actuating said clock pulse generating means in response thereto after a predetermined time delay.

5. The system of claim 1 wherein said actuating means includes means for detecting the respective line synchronizing pulse, means for generating a timing pulse in response to said detecting means, said timing pulse terminating after termination of the respective line synchronizing pulse, and means for generating an enabling signal in response to termination of said timing pulse, said clock pulse generating means being actuated in response to said enabling signal, said first counting means being coupled to said enabling signal generating means for terminating said enabling signal in response to said first predetermined number of clock pulses.

6. The system of claim 1 wherein said coupling means includes video signal gate means actuated in response to said sampling pulses.

7. The system of claim 6 wherein said video signal gate means is also actuated in response to said line and frame synchronizing signals.

8. The system of claim 1 wherein said actuating means includes means for detecting and separating the respective line and frame synchronizing pulses, means coupled to said detecting means for generating a timing pulse in response to a respective line synchronizing pulse, said timing pulse terminating after termination of the respective line synchronizing pulse, and means coupled to said timing pulse generating means for generating an enabling signal in response to termination of said timing pulse, said clock pulse generating means being coupled to said enabling signal generating means and actuated in response thereto, said first counting means being coupled to said enabling signal generating means for terminating said enabling signal in response to said predetermined number of clock pulses, said first counting means being coupled to said detecting means and reset in response to a respective line synchronizing signal, said second counting means including means for generating said sampling pulses which are respectively narrower than said clock pulses, said coupling means including video signal gate means, and circuit means coupling said detecting means and said second counting means to said gate means for actuating the same in response to said line and frame synchronizing pulses and said sampling pulses.

9. The system of claim 1 wherein said input circuit means includes camera means and said output circuit means includes video signal transmission means.

10. The system of claim 1 wherein said input circuit means includes video signal transmission means and said output circuit means includes a monitor for displaying the video signal passed by said coupling means.

11. The system of claim 1 wherein said first counting means includes second selectively actuable means for alternatively deactuating said clock pulse generating means in response to said first predetermined number of clock pulses and to a third predetermined number of clock pulses generated during a said interval, said second number being divisible into said third number by said first integer but with a third integer remainder higher than said second integer remainder, said third predetermined number and said third integer remainder being of said one numerical quantity, and means for actuating said second selectively actuable means in response to each said frame to provide said first and third number of clock pulses in alternate frames, respectively.

12. The system of claim 11 wherein said last-named actuating means includes means for detecting the last line of a said frame and for actuating said second selectively actuatable means in response thereto.

13. The system of claim 11 wherein said last-named actuating means includes means for detecting the last line of a said frame, means for actuating said second selectively actuable means in response to said detecting means, and means responsive to said detecting means for inhibiting said actuating means during the last line of each frame whereby the same number of clock pulses is generated during the last line of each frame.

14. The system of claim 1 further comprising monitor means having a video signal input circuit, means for delaying said train of sampled video signal pulses by a time less than the period thereof, and means for coupling both said train of sampled video signals and said delayed train to said monitor means input circuit.

15. The system of claim 1 further comprising monitor means having a video signal input circuit, means coupled to said output circuit means for delaying said train of sampled video signal pulses by a time less than the period thereof, and means coupling both said output circuit means and said delay means to said monitor means input circuit.

16. The system of claim 15 wherein said coupling means includes means for generating a train of video pulses of fixed predetermined amplitude in response to said train of delayed sampled video pulses.

17. The system of claim 1 further comprising monitor means having a video signal input circuit, means for coupling said train of sampled video signals to said monitor means input circuit, and means for inserting other video signal pulses between the pulses of said train of sampled video signal pulses.

18. The system of claim 17 wherein said inserting means includes means for generating said other pulses having a fixed predetermined amplitude.

19. The system of claim 17 wherein said inserting means includes means for generating said other pulses each having an amplitude proportional to the amplitude of the immediately preceding pulse of said train of sampled video signal pulses.

20. The system of claim 17 wherein said inserting means includes means for comparing the amplitudes of adjacent pulses of said train of sampled video signals and for generating said other pulses each having an amplitude in response thereto.

21. The system of claim 1 further comprising monitor means having a video signal input circuit, video signal storage means having a plurality of storage channels equal in number to said second predetermined number, means for sequentially coupling said output circuit means to successive channels during successive ones of said frames, and means for simultaneously reading-out the sampled video signal pulses stored in said channels, said read-out means being coupled to said monitor means input circuit.

22. The system of claim 21 wherein said storage means includes an endless video signal recording element, means for advancing said element through one cycle during each said frame, and recording means for each said channel, said recording means being at a first location, said reading-out means being at a second location spaced from said first location in the direction of advance of said recording element, and further comprising means for selectively erasing each of said channels, said erasing means being at a third location spaced from said second location in the direction of said advance, and means for sequentially energizing successive ones of said erasing means one frame in advance of recording on the respective channel.

23. The system of claim 1 further comprising video signal storage means having a plurality of storage channels equal in number to said second predetermined number, means for coupling said output circuit means to each of said channels, and means for simultaneously reading-out the sampled video signal pulses stored in said channels.

24. The system of claim 23 wherein said storage means comprises a video signal recording element, means for advancing said element at a predetermined rate, and a plurality of recording means for said channels, respectively, said reading-out means including a plurality of pick-up means for said channels, respectively, one of said plurality of recording and pick-up means being spaced-apart in the direction of advance of said recording element by the distance said element is advanced during one said frame.

25. The system of claim 1 further comprising analog-to-digital converting means coupled to said output circuit means for digitally quantizing said sampled video signal pulses on a predetermined number of amplitude levels.

26. A method of television transmission comprising the steps of: generating a raster-type time-based video signal having recurrent line and frame synchronizing pulses, there being a predetermined number of lines in each frame, said signal including an information-conveying portion having a predetermined minimum duration interval between said line synchronizing pulses; generating a train of first pulses having a first predetermined integral number of pulses during each said interval; generating one sampling pulse for each successive group of a second predetermined number of said first pulses, taken cumulatively from line to line, said second number being divisible into said first number by a first integer greater than one with a second integer remainder, said number of lines, said first predetermined number of first pulses, and said remainder integer being of one numerical quality, said quality being odd or even, and said second predetermined number being of the other numerical quality; and transmitting said video signal during said sampling pulses only.

27. The method of claim 26 wherein generation of each said train of first pulses is initiated adjacent to the start of the respective interval.

28. The method of claim 27 wherein generation of each said train of first pulses is initiated a predetermined time after the respective line synchronizing pulse.

29. In a television system including means for generating a raster-type time-based video signal having recurrent line and frame synchronizing pulses, there being a predetermined number of lines in each frame, said video signal having an information-conveying portion between said line synchronizing pulses; a sequential dot interlace system comprising means for generating a first predetermined integral number of first pulses during each said video signal portion; means for generating one sampling pulse for each successive group of a second predetermined number of said first pulses, taken cumulatively from line-to-line, said second number being divisible into said first number by a first integer greater than one with a second integer remainder, said number of lines, said first number and said remainder integer being of one numerical quality, said quality being odd or even, and said second number being of the other numerical quality; and means for sampling said video signal in response to said sampling pulses.

30. The system of claim 29 wherein the quotient $LD/n_1n_2$ is irreducible, where L is said number of lines, D is said first number, $n_1$ is the vertical interlace ratio, and $n_2$ is said second number.

References Cited

UNITED STATES PATENTS

| | | | |
|---|---|---|---|
| 2,479,880 | 8/1949 | Toulon | 178—7.7 |
| 2,801,278 | 7/1957 | Moore | 178—7.7 XR |
| 2,823,258 | 2/1958 | Schlesinger et al. | |
| 3,136,847 | 6/1964 | Brown | 178—6.8 |
| 3,309,461 | 3/1967 | Deutsch. | |
| 3,342,937 | 9/1967 | Deutsch. | |

ROBERT L. GRIFFIN, Primary Examiner

ROBERT L. RICHARDSON, Assistant Examiner

U.S. Cl. X.R.

178—7.7, 69.5